UNITED STATES PATENT OFFICE.

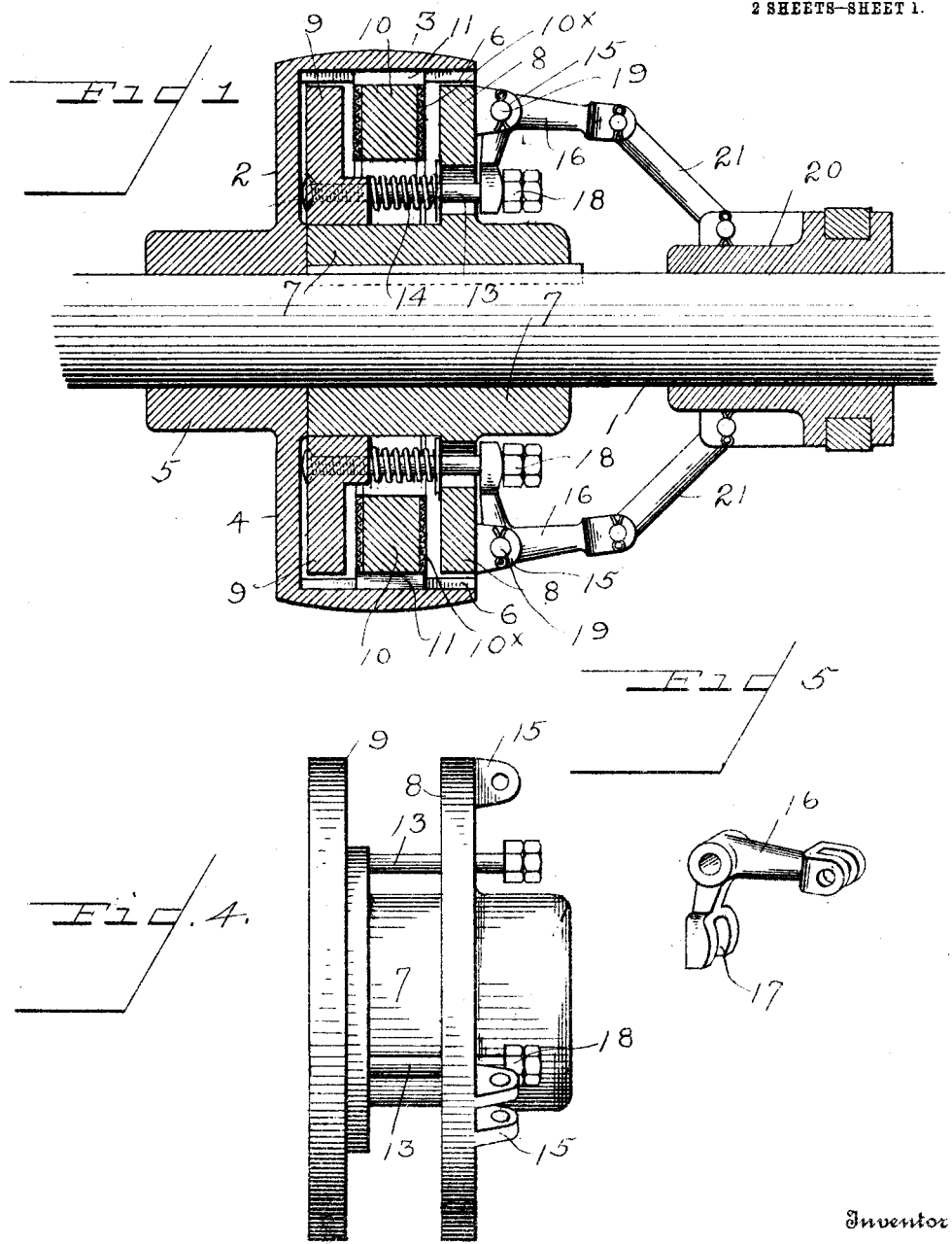

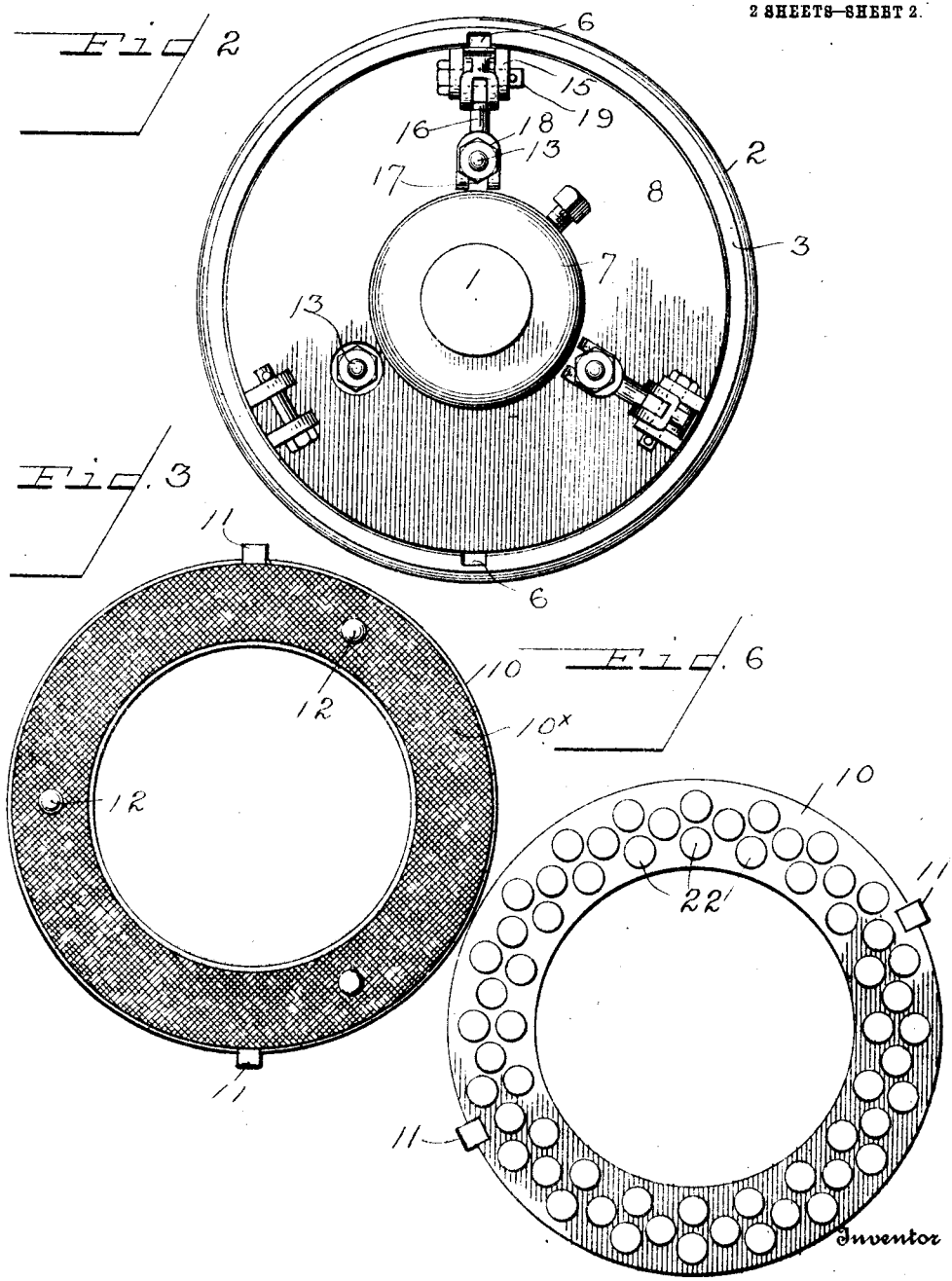

GEORGE STAHL, OF DAYTON, OHIO, ASSIGNOR TO THE EDGEMONT MACHINE COMPANY, OF DAYTON, OHIO, A CORPORATION OF OHIO.

FRICTION-CLUTCH.

1,062,860.  Specification of Letters Patent.  Patented May 27, 1913.

Application filed June 26, 1911. Serial No. 635,312.

*To all whom it may concern:*

Be it known that I, GEORGE STAHL, a citizen of the United States, residing at Dayton, in the county of Montgomery and State of Ohio, have invented certain new and useful Improvements in Friction-Clutches, of which the following is a specification.

My invention relates to clutches, and particularly to friction clutches adapted to connect a normally loose pulley with the drive shaft upon which the pulley is mounted, but which may be adapted to other purposes such as connecting a driving and driven shaft, etc.

The object of the invention is to provide in a friction clutch embodying a friction member adapted to be clamped between relatively movable clamping members, improved means for adjusting the clamping members, which will be cheap in construction, capable of being readily connected and disconnected to permit access to the friction and clamping members, efficient in use, easily and quickly operated, positive in action and unlikely to get out of repair.

With the above primary and other incidental objects in view as will more fully appear in the specification, the invention consists of the features of construction, the parts and combinations thereof and the mode of operation or their equivalents, as hereinafter described and set forth in the claims.

Referring to the drawings, Figure 1 is a longitudinal sectional view through the assembled clutch. Fig. 2 is a side view of the clutch. Fig. 3 is a detail side elevation of the friction ring removed from the pulley. Fig. 4 is a detail view of the clamping disk and clamping ring which engage the friction member. Fig. 5 is a detail view of one of the bell levers employed to move the clamping ring into engagement with the friction ring. Fig. 6 is a detail view of a modification of the friction ring.

Like parts are indicated by similar characters of reference throughout the several views.

In the drawings 1 is the drive shaft upon which is loosely journaled a driven pulley 2. The pulley is so constructed that the peripheral flange 3 projects laterally from the web 4 forming an annular recess within the flange 3. A bearing hub 5 projects in the opposite direction from the web 4. Located in the inner periphery of the flange 3 are two or more key ways or grooves 6. Secured upon the shaft 1 and projecting within the recess of the pulley 2 to a point adjacent to the web 4 is a hub or collar 7 secured to the shaft 1 by means of set screws or a key or other driving connection. Formed integral with the hub or collar 7 is a clamping disk 8, while slidingly mounted upon the hub or collar 7 is a movable clamp ring 9 adjustable to and from the fixed disk 8. It is to be understood that while the fixed disk 8 and the movable clamping ring 9 are located within the annular recess formed by the flange 3 of the pulley, such parts are entirely independent of the pulley. Interposed between the fixed disk 8 and the movable clamping ring 9 is a friction ring 10 having in the periphery thereof keys or splines 11 adapted to engage the key ways or grooves 6 of the pulley 2. The friction ring 10 is capable of lateral movement in relation to the pulley, the keys or splines 11 thereof sliding in the key ways 6 of said pulley. The opposite faces of the friction ring 10 are covered with facings $10^x$ of friction material, it having been found in practice that a friction surface formed of wire mesh charged with asbestos or other fibrous material being preferable. This coating of friction material is secured to the friction ring 10 by copper rivets 12 as shown in Fig. 3. Fixed upon the movable clamping ring 9 and projecting through suitable openings in the fixed disk 8 are studs 13 about which are located helical springs 14 intermediate the clamping rings 9 and the fixed disk 8. The helical springs 14 tend to separate the clamping ring 9 and the fixed disk 8 maintaining said parts out of contact with the interposed friction ring 10.

Pivoted to ears 15 formed upon the fixed disk 8 are a plurality of bell levers 16 the inner ends of which are bifurcated as shown at 17, within which bifurcation the stud 13 projects. The studs 13 are provided with heads or nuts 18 at points beyond the engagement of the bell lever 16 with said studs, whereby the bell levers upon oscillation will engage such heads or nuts 18 moving the clamping ring 9 toward the fixed disk 8 against the tension of the interposed springs 14. The pivotal studs 19 of the bell levers 16 are removable whereby upon the removal of such pivotal studs 19 the bifurcated extremities of the bell levers may be disengaged from the studs 13 of the clamp ring 9 permitting the clutch to be readily disassembled for inspection or repairs. Slidingly mounted upon the shaft 1 is a shift collar 20 to which are pivoted links 21 pivotally connected at their opposite end to the projecting arms of the bell levers 16.

It is to be understood that either the shaft 1 or the pulley 2 may constitute the driving members. Assuming that the shaft 1 is the drive member the hub or collar 7 and the integral disk 8 rigidly connected with the shaft revolves in unison with said shaft, while the pulley 2 which is loosely journaled upon the shaft will remain at rest, as would also the friction ring 10 which is connected with the pulley 2 by means of the keys or splines 11 engaging in the key ways or grooves 6 of said pulleys. The pulley 2 and friction ring 10 are thus normally independent of the parts carried by the drive shaft 1. When it is desired that pulley 2 shall rotate in unison with the drive shaft 1 the shift sleeve or collar 20 is moved longitudinally toward the hub or collar 7, thereby causing an oscillation of the bell lever 16 by means of the connecting links 21. The oscillation of the bell levers 16 will force the studs 13 outward against the tension of the springs 14 thereby causing frictional contact between the clamping ring 9 and the friction ring 10 sufficient to initially rotate the pulley 2. The further oscillation of the bell lever 16 will cause the clamping ring 9 to shift the friction ring laterally within the grooves or key ways 6 until the opposite side of the friction ring is brought into contact with the fixed disk 8, whereupon the friction ring 10 is securely clamped between the clamp ring 9 and said disk 8. It will thus be seen that the frictional engagement of the clutch is very gradual, first the clamping ring 9 engaging the friction ring 10 with gradually increasing pressure until the friction ring is shifted into engagement with the disk 8, which pressure is also gradually increased until the maximum clamping pressure is obtained.

For certain classes of work it is desirable to use a friction ring of different character than that heretofore described, such modification of the friction ring being shown in Fig. 6. In this figure there is shown a friction member comprising an annular ring having therein a plurality of holes arranged in staggered relation into which holes are driven a plurality of wooden pegs or pins 22 which pins project a limited extent from the opposite sides of the annular member and form the frictional surface to be engaged by the clamping ring 9 and the fixed disk 8.

It will be obvious that the clutch construction thus described provides a maximum frictional surface and that the engagement of the clutch will be gradual avoiding a sudden jar to the driven machinery upon the engagement of the clutch. Furthermore that by the removal of the pivot pins 19 of the bell lever 16 the said bell levers on account of their bifurcated extremities may be readily disengaged from the studs 13 whereupon the several parts may be readily withdrawn from each other, thus enabling the clutch to be readily disconnected for inspection or repairs.

From the above description it will be apparent that there is thus provided a device of the character described, possessing the particular features of advantage before enumerated as desirable, but which obviously is susceptible of modification in its form, proportion, detail construction and arrangement of parts, without departing from the principle involved or sacrificing any of its advantages.

Having thus described my invention I claim:

1. In a friction clutch of the type having a disk connected to one member and interposed between a disk and a clamping ring on the other member, the improvement comprising studs carried by the clamping ring and projecting through openings in the disk, heads on said studs of less diameter than the diameter of the openings in the disk whereby the heads may be passed through the openings in assembling or disassembling the device, bell crank levers mounted on the exterior of the disk, having one arm bifurcated to engage the studs of the clamping ring, and means to actuate the bell crank levers.

2. In a friction clutch embodying a pulley carrying a friction member and a clamping member comprising two relatively movable clamping bodies normally independent of the pulley and friction member but adapted upon movement to engage opposite sides of the friction member the combination of studs carried by one of the clamping bodies and projecting through perforations in the opposite clamping body, said perforations being of such dimensions as to permit the free movement of the studs therethrough, and operating levers detachably engaging the studs at points beyond the perforated clamping body and means for oscillating the levers substantially as and for the purposes specified.

3. In a friction clutch embodying a pulley carrying a friction member and a clamping member comprising two relatively movable clamping bodies normally independent of the pulley and friction member but adapted upon movement to engage opposite sides of the friction member the combination of studs carried by one of the clamping bodies and projecting through perforations in the opposite clamping body, heads on said studs, said heads being of less dimensions than the said perforations whereby said studs and heads may be freely inserted in and removed from the perforations, and bifurcated operating levers engaging the stud heads when projected through the perforations and means for oscillating the levers, substantially as specified.

In testimony whereof, I have hereunto set my hand this 17 day of June 1911.

GEORGE STAHL.

Witnesses:
 HARRY F. NOLAN,
 O. B. COFFMAN.